United States Patent
Cook

(10) Patent No.: US 9,535,428 B2
(45) Date of Patent: Jan. 3, 2017

(54) SPRING CONTROLLED VALVE

(71) Applicant: Proportion-Air, Inc., McCordsville, IN (US)

(72) Inventor: Dan Cook, McCordsville, IN (US)

(73) Assignee: Proportion-Air, Inc., McCordsville, IN (US)

(*) Notice: Subject to any disclaimer, the term of this patent is extended or adjusted under 35 U.S.C. 154(b) by 405 days.

(21) Appl. No.: 13/897,969

(22) Filed: May 20, 2013

(65) Prior Publication Data

US 2014/0338763 A1 Nov. 20, 2014

(51) Int. Cl.
*F16K 31/12* (2006.01)
*G05D 16/10* (2006.01)
*F16K 1/40* (2006.01)

(52) U.S. Cl.
CPC ............... *G05D 16/10* (2013.01); *F16K 1/40* (2013.01); *Y10T 137/7793* (2015.04)

(58) Field of Classification Search
CPC ..... G05D 16/10; F16K 1/40; Y10T 137/7793; Y10T 137/7782; Y10T 137/7796; Y10T 137/7798; Y10T 137/7812
USPC ...................................... 251/902; 137/505.13
See application file for complete search history.

(56) References Cited

U.S. PATENT DOCUMENTS

| | | | | |
|---|---|---|---|---|
| 342,275 A * | 5/1886 | Walters | | 137/505.22 |
| 1,029,097 A * | 6/1912 | Atkinson | | 137/505.13 |
| 1,079,985 A * | 12/1913 | Kaminsky | | 137/504 |
| 1,395,932 A * | 11/1921 | Staude | | 137/479 |
| 2,329,323 A * | 9/1943 | Benz | | 222/40 |
| 3,513,874 A * | 5/1970 | Welsh et al. | | 137/843 |
| 3,576,193 A * | 4/1971 | Rothfuss et al. | | 137/116.5 |
| 3,896,834 A * | 7/1975 | Paul, Jr. | | 137/625.28 |
| 3,957,083 A * | 5/1976 | Gallo | | 138/43 |
| 4,840,195 A * | 6/1989 | Zabrenski | | 137/312 |
| 5,722,454 A * | 3/1998 | Smith et al. | | 137/503 |
| 5,931,375 A * | 8/1999 | Gylov et al. | | 236/42 |
| 2004/0261859 A1* | 12/2004 | Callies | | 137/495 |
| 2005/0056318 A1* | 3/2005 | Arlinghaus, Jr. | | 137/505.13 |

FOREIGN PATENT DOCUMENTS

| | | |
|---|---|---|
| DE | 1750620 | 2/1971 |
| FR | 1495670 | 9/1967 |
| FR | 2715208 | 7/1995 |
| JP | 57107065 | 7/1982 |
| JP | S60260788 A | 12/1985 |
| JP | 6189572 | 6/1986 |
| JP | 2005214295 | 8/2005 |

(Continued)

OTHER PUBLICATIONS

Machine Translation from EPO website of FR1495670 (obtained May 13, 2015).*

(Continued)

*Primary Examiner* — Jessica Cahill
(74) *Attorney, Agent, or Firm* — Faegre Baker Daniels LLP

(57) ABSTRACT

The present disclosure provides a spring controlled valve including a spring being movable between an expanded position wherein coils of the spring are spaced apart from one another thereby permitting gas flow through the valve and a compressed position wherein the coils are in contact with one another thereby substantially preventing gas flow through the valve.

28 Claims, 11 Drawing Sheets

(a)

(b)

(56) References Cited

FOREIGN PATENT DOCUMENTS

WO 7900212 4/1979

OTHER PUBLICATIONS

International Search Report and Written Opinion issued by the European Patent Office dated Sep. 15, 2014, for related International Application No. PCT/US2014/037989; 13 pages.
International Search Report and Written Opinion issued by the European Patent Office, dated Sep. 13, 2014, for International Application No. PCT/US2014/037989; 108 pages.

* cited by examiner

SPRING CONTROLLED VALVE

FIELD OF THE DISCLOSURE

The present disclosure relates to a spring controlled valve, and more particularly to a valve wherein the flow through and/or pressure drop across a chamber is a function of the spring constant of a spring used to influence the flow and/or pressure drop across the chamber.

BACKGROUND OF THE DISCLOSURE

It is desirable to control the flow and/or pressure of gas or fluids for various purposes. Many different types of valves are known. None of these valves, however, use the coils of a spring to control the flow of gas through the valve and, in certain embodiment, to set various valve parameters as a function of a constant of the spring.

SUMMARY OF THE DISCLOSURE

In one exemplary embodiment of the present disclosure, a valve for controlling gas flow is provided. The valve includes a spring having a central opening, a first end connected to an opening into an interior of an enclosure to permit gas flow from the interior to the central opening, and a second end connected to a plate to prevent gas flow from the central opening to an exterior of the enclosure, the spring being movable between a normally expanded state wherein coils of the spring are spaced apart from one another to permit gas flow from the central opening to the exterior of the enclosure and a compressed state wherein the coils are in contact with one another to prevent gas flow from the central opening to the exterior of the enclosure. In this embodiment, when a difference in pressure between the interior and the exterior of the enclosure is above a certain value, gas exterior to the enclosure applies a force to the plate that is sufficient to overcome a constant of the spring and force the spring into its compressed state, thereby preventing gas flow from the interior of the enclosure, through the coils of the spring, to the exterior of the enclosure, and when the difference is below the certain value, the force is insufficient to overcome the spring constant and the spring moves to its normally expanded state, thereby permitting gas flow from the interior of the enclosure, through the coils of the spring, to the exterior of the enclosure. In one aspect of this embodiment, the coils of the spring are coated with a substantially resilient material so that when the spring is in its compressed state and the coils are in contact with one another, the resilient material forms a gas-tight seal between the coils.

In another embodiment, a valve for controlling gas flow is provided. The valve includes a spring being movable between a compressed state wherein coils of the spring prevent gas flow from a central opening of the spring to an exterior space and an expanded state wherein the coils permit gas flow from the central opening to the exterior space, the spring having a first end in flow communication with gas at a first pressure and a second end configured to prevent gas flow from the central opening to the exterior space. In this embodiment, the spring remains in its compressed state when the first pressure is sufficiently below pressure of gas in the exterior space, thereby preventing gas flow from the first end through the coils of the spring, and the spring moves to its expanded state when the first pressure is not sufficiently below the pressure of the gas in the exterior space, thereby permitting gas flow from the first end through the coils of the spring. In one aspect of this embodiment, the gas at the first pressure is sealed within an enclosure by the spring when the spring is in the compressed state. In another aspect of this embodiment, the coils of the spring are coated with a substantially resilient material so that when the spring is in its compressed state and the coils are in contact with one another, the resilient material forms a gas-tight seal between the coils.

In still another embodiment according to the present disclosure, a gas operated valve is provided. The valve includes a housing having an upper portion and a lower portion; an actuator having a piston disposed in the upper portion, a plate disposed in the lower portion, and a rod connecting the piston to the plate; and a spring disposed in the lower portion, the spring having a central opening defined by a plurality of coils and being movable between an expanded state and a compressed state. In this embodiment, the upper portion of the housing has an inlet opening to receive control gas exterior to the housing, and the lower portion of the housing has an inlet opening to receive supply gas and an outlet opening to provide the supply gas to an application. Additionally, the amount of supply gas flow from the lower portion inlet opening to the outlet opening varies with movement of the spring between the expanded state, wherein supply gas flows into the lower portion inlet opening, into the central opening of the spring, out of the central opening through gaps between the coils, and out of the lower portion through the outlet opening, and the compressed state, wherein the coils are in contact with one another thereby substantially preventing supply flow between the lower portion inlet opening and the outlet opening, the movement of the spring being controlled by movement of the actuator in response to pressure of the control gas at the upper portion inlet opening. In one aspect of this embodiment, the housing further includes a connecting portion having a bore extending therethrough between the upper portion and the lower portion, the actuator rod extending through the bore. In a variant of this aspect, the housing further includes an O-ring disposed in the bore in contact with the rod to prevent gas flow between the upper portion and the lower portion. In another aspect of this embodiment, the actuator further includes an O-ring disposed about a perimeter of the piston in contact with an inner surface of the upper portion, the O-ring thereby preventing gas flow between a lower chamber of the upper portion and an upper chamber of the upper portion. In a variant of this aspect, the housing further includes a vent opening in the lower chamber of the upper portion. In still another aspect of this embodiment, the coils of the spring are coated with a substantially resilient material so that when the spring is in its compressed state and the coils are in contact with one another, the resilient material forms a gas-tight seal between the coils. In another aspect, as the pressure of the control gas increases, the control gas at the upper portion inlet opening applies increased pressure to a surface of the piston to move the piston toward the spring, thereby causing the plate to compress the spring against a force of a constant of the spring, reduce the gaps between the coils, and increase resistance to the flow of supply gas from the lower portion inlet opening to the outlet opening. In yet another aspect, the lower portion inlet opening is in flow communication with the central opening of the spring through a first end of the spring, such that when the spring is in the expanded state, the supply gas flows into the lower portion inlet opening, into the central opening of the spring through the first end of the spring, out of the central opening through the gaps between the coils, and out of the lower portion through the outlet opening. In another aspect of this embodiment, the central opening of the spring is closed on one end of the spring by a wall of the housing and on the other end of the spring by the actuator plate. In a variant of this aspect, the lower portion inlet opening and outlet opening are disposed between the ends of the spring such that when the spring is in the expanded state, the supply gas flows into the lower portion inlet opening, into the central opening of the spring through the gaps between the coils, out of the central opening through the gaps between the coils, and out of the lower portion through the outlet opening.

In yet another embodiment according to the present disclosure, a mechanically operated valve is provided. The valve includes a housing having an inlet opening for receiving supply gas and an outlet opening for providing supply gas to an application; a spring disposed in the housing having a central opening defined by a plurality of coils extending between a first end in flow communication with the inlet opening and a second end; and an actuator having a plate disposed in the housing in contact with the second end of the spring to prevent gas flow out of the central opening at the second end, a rod coupled to the plate, and a drive lever coupled to the rod, the drive lever being movable between a first position wherein the spring is in an expanded state thereby permitting supply gas from the inlet opening to flow into the central opening through the first end of the spring, out of the central opening through gaps between the coils, and out of the housing through the outlet opening, and a second position wherein the drive lever, through the rod and the plate, applies force to the second end of the spring to move the spring to a compressed state, wherein the coils of the spring are in contact with one another thereby substantially preventing supply gas from flowing out of the central opening of the spring. In one aspect of this embodiment, the housing further includes a connecting portion having a bore extending therethrough into the lower portion, the actuator rod extending through the bore. In a variant of this aspect, the housing further includes an O-ring disposed in the bore in contact with the rod to prevent gas flow between out of the lower portion. In another aspect of this embodiment, the coils of the spring are coated with a substantially resilient material so that when the spring is in its compressed state and the coils are in contact with one another, the resilient material forms a gas-tight seal between the coils.

In still another embodiment according to the present disclosure, a mechanically operated valve is provided. The valve includes a housing having an inlet opening for receiving supply gas and an outlet opening for providing supply gas to an application; a spring disposed in the housing having a central opening defined by a plurality of coils extending between a first end in contact with a lower wall of the housing and a second end; and an actuator having a plate disposed in the housing in contact with the second end of the spring to prevent gas flow out of the central opening at the second end, a rod coupled to the plate, and a drive lever coupled to the rod, the drive lever being movable between a first position wherein the spring is in an expanded state thereby permitting supply gas from the inlet opening to flow into the central opening through gaps between the coils of the spring, out of the central opening through the gaps, and out of the housing through the outlet opening, and a second position wherein the drive lever, through the rod and the plate, applies force to the second end of the spring to move the spring to a compressed state, wherein the coils of the spring are in contact with one another thereby substantially preventing supply gas from flowing into the central opening of the spring. In one aspect of this embodiment, the housing further includes a connecting portion having a bore extending therethrough into the lower portion, the actuator rod extending through the bore. In a variant of this aspect, the housing further includes an O-ring disposed in the bore in contact with the rod to prevent gas flow between out of the lower portion. In another aspect of this embodiment, the coils of the spring are coated with a substantially resilient material so that when the spring is in its compressed state and the coils are in contact with one another, the resilient material forms a gas-tight seal between the coils.

In yet another embodiment according to the present disclosure, a pressure regulator is provided. The regulator includes a housing having a lower portion and an upper portion, the lower portion being coupled to a first conduit to receive supply gas and a second conduit to provide the supply gas to an application, the upper portion being coupled to a third conduit which is coupled as a tap to the second conduit; a spring disposed in the lower portion having a first end in contact with a wall of the housing and a second end; and an actuator including a piston disposed in the upper portion, a plate disposed in the lower portion in contact with the second end of the spring, and a rod connecting the piston to the plate. In this embodiment, the spring is movable between a normally expanded state, wherein supply gas can flow from the first conduit to the second conduit through gaps in a plurality of coils of the spring, and a compressed state wherein the coils are in contact with one another thereby substantially preventing supply gas from flowing from the first conduit to the second conduit. Additionally, as pressure of the supply gas at the first conduit increases, pressure of the supply gas at the second conduit is regulated as a function of a constant of the spring in that gas flowing though the second conduit also flows through the third conduit into the upper chamber and applies pressure against the piston, causing the plate to move the spring, against the spring constant, toward the compressed state, thereby moving the coils closer together and increasing resistance to gas flow. In one aspect of this embodiment, the housing further includes a connecting portion having a bore extending therethrough between the upper portion and the lower portion, the actuator rod extending through the bore. In a variant of this aspect, the housing further includes an O-ring disposed in the bore in contact with the rod to prevent gas flow between the upper portion and the lower portion. In another aspect, the actuator further includes an O-ring carried by the piston in contact with an inner surface of the upper portion, the O-ring thereby preventing gas flow between a lower chamber of the upper portion and an upper chamber of the upper portion. In a variant of this aspect, the housing further includes a vent opening in the lower chamber of the upper portion. In another aspect of this embodiment, the coils of the spring are coated with a substantially resilient material so that when the spring is in its compressed state and the coils are in contact with one another, the resilient material forms a gas-tight seal between the coils. In yet another aspect, the central opening of the spring is closed at the first end by the wall of the housing and closed at the second end by the actuator plate. In still another aspect of this embodiment, the first and second conduits are coupled to the lower portion at locations between the ends of the spring such that when the spring is in the expanded state, the supply gas flows from the first conduit, into the central opening of the spring through the gaps between the coils, out of the central opening through the gaps between the coils, and out of the lower portion through the second conduit.

In yet another embodiment of the present disclosure, a flow restrictor is provided. The flow restrictor includes a housing having a lower portion and an upper portion, the lower portion being coupled to a first conduit to receive supply gas and a second conduit to provide the supply gas to an application, the upper portion being coupled to a third conduit which is coupled as a tap to the first conduit; a spring disposed in the lower portion having a first end in contact with a wall of the housing and a second end; and an actuator including a piston disposed in the upper portion, a plate disposed in the lower portion in contact with the second end of the spring, and a rod connecting the piston to the plate. In this embodiment, the spring is movable between a normally expanded state, wherein supply gas can flow from the first conduit to the second conduit through gaps in a plurality of coils of the spring, and a compressed state wherein the coils are in contact with one another thereby substantially preventing supply gas from flowing from the first conduit to the second conduit. Additionally, as pressure of the supply gas at the first conduit increases, flow of the supply gas at the second conduit is regulated as a function of a constant of the spring in that gas flowing though the first conduit also flows through the third conduit into the upper chamber and applies pressure against the piston, causing the plate to move the spring, against the spring constant, toward the compressed state, thereby moving the coils closer together and increasing resistance to gas flow. In one aspect of this embodiment, the housing further includes a connecting portion having a bore extending therethrough between the upper portion and the lower portion, the actuator rod extending through the bore. In a variant of this aspect, the housing further includes an O-ring disposed in the bore in contact with the rod to prevent gas flow between the upper portion and the lower portion. In another aspect of this embodiment, the actuator further includes an O-ring carried by the piston in contact with an inner surface of the upper portion, the O-ring thereby preventing gas flow between a lower chamber of the upper portion and an upper chamber of the upper portion. In a variant of this aspect, the housing further includes a vent opening in the lower chamber of the upper portion. In another aspect, the coils of the spring are coated with a substantially resilient material which forms a substantially gas-tight seal between the coils when the spring is in the compressed state. In still another aspect, the central opening of the spring is closed at the first end by the wall of the housing and closed at the second end by the actuator plate. In yet another aspect of this embodiment, the first and second conduits are coupled to the lower portion at locations between the ends of the spring such that when the spring is in the expanded state, the supply gas flows from the first conduit, into the central opening of the spring through the gaps between the coils, out of the central opening through the gaps between the coils, and out of the lower portion through the second conduit.

In another embodiment of the present disclosure, a back-pressure regulator is provided. The regulator includes a housing having a lower portion and an upper portion, the lower portion being coupled to a first conduit to receive supply gas and a second conduit to provide the supply gas to an application, the upper portion being coupled to a third conduit which is coupled as a tap to the first conduit; a spring disposed in the lower portion having a first end attached to a wall of the housing and a second end; and an actuator including a piston disposed in the upper portion, a plate disposed in the lower portion attached to the second end of the spring, and a rod connecting the piston to the plate. In this embodiment, the spring is movable between a normally compressed state, wherein coils of the spring are in contact with one another thereby substantially preventing supply gas from flowing from the first conduit to the second conduit, and an expanded state wherein the coils are moved apart from one another thereby permitting supply gas to flow from the first conduit to the second conduit through gaps between the coils. Additionally, the spring substantially prevents supply gas flow through the lower portion of the housing until a pressure of the supply gas at the first conduit, which is applied to the piston through the third conduit, is sufficient to move the actuator away from the spring, thereby overcoming a constant of the spring and moving the spring out of the normally compressed state. In one aspect of this embodiment, the housing further includes a connecting portion having a bore extending therethrough between the upper portion and the lower portion, the actuator rod extending through the bore. In a variant of this aspect, the housing further includes an O-ring disposed in the bore in contact with the rod to prevent gas flow between the upper portion and the lower portion. In another aspect of this embodiment, the actuator further includes an O-ring carried by the piston in contact with an inner surface of the upper portion, the O-ring thereby preventing gas flow between a lower chamber of the upper portion and an upper chamber of the upper portion. In a variant of this aspect, the housing further includes a vent opening in the upper chamber of the upper portion, the third conduit being coupled to the lower chamber of the upper portion. In another aspect of this embodiment, the coils of the spring are coated with a substantially resilient material which forms a substantially gas-tight seal between the coils when the spring is in the compressed state. In yet another aspect, the central opening of the spring is closed at the first end by the wall of the housing and closed at the second end by the actuator plate. In still another aspect of this embodiment, the first and second conduits are coupled to the lower portion at locations between the ends of the spring such that when the spring is in the expanded state, the supply gas flows from the first conduit, into the central opening of the spring through the gaps between the coils, out of the central opening through the gaps between the coils, and out of the lower portion through the second conduit.

In another embodiment of the present disclosure, a back-pressure regulator is provided. The regulator includes a housing having a lower portion and an upper portion, the lower portion having a first opening in flow communication with gas exterior to the housing and an opening in flow communication with the gas, the upper portion having a first opening in flow communication with a conduit coupled to the first opening of the lower portion; a spring disposed in the lower portion; and an actuator including a piston disposed in the upper portion, a plate disposed in the lower portion attached to the spring, and a rod connecting the piston to the plate. In this embodiment, the spring is movable between a normally compressed state, wherein coils of the spring are in contact with one another thereby substantially preventing gas flow between the first and second openings of the lower portion, and an expanded state wherein the coils are moved apart from one another thereby permitting gas flow between the first and second openings of the lower portion through gaps between the coils. Additionally, the spring substantially prevents gas flow through the lower portion of the housing until a pressure of the gas at the first opening of the lower portion, which is applied to the piston through the conduit, is sufficient to move the actuator away from the spring, thereby overcoming a constant of the spring and moving the spring out of the normally compressed state.

In one aspect of this embodiment, the housing further includes a connecting portion having a bore extending therethrough between the upper portion and the lower portion, the actuator rod extending through the bore. In a variant of this aspect, the housing further includes an O-ring disposed in the bore in contact with the rod to prevent gas flow between the upper portion and the lower portion. In another aspect of this embodiment, the actuator further includes an O-ring carried by the piston in contact with an inner surface of the upper portion, the O-ring thereby preventing gas flow between a lower chamber of the upper portion and an upper chamber of the upper portion. In a variant of this aspect, the conduit is coupled to the lower chamber of the upper portion. In yet another aspect of this embodiment, the coils of the spring are coated with a substantially resilient material which forms a substantially gas-tight seal between the coils when the spring is in the compressed state. In another aspect of this embodiment, the spring includes a central opening which is in flow communication with the first opening of the lower portion at a first end and closed at a second end by the actuator plate. In a variant of this aspect, the spring is in the expanded state, the gas flows from the first opening, into the central opening of the spring through the first end of the spring, out of the central opening through the gaps between the coils, and out of the lower portion through the second opening.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein.

Figure 1:
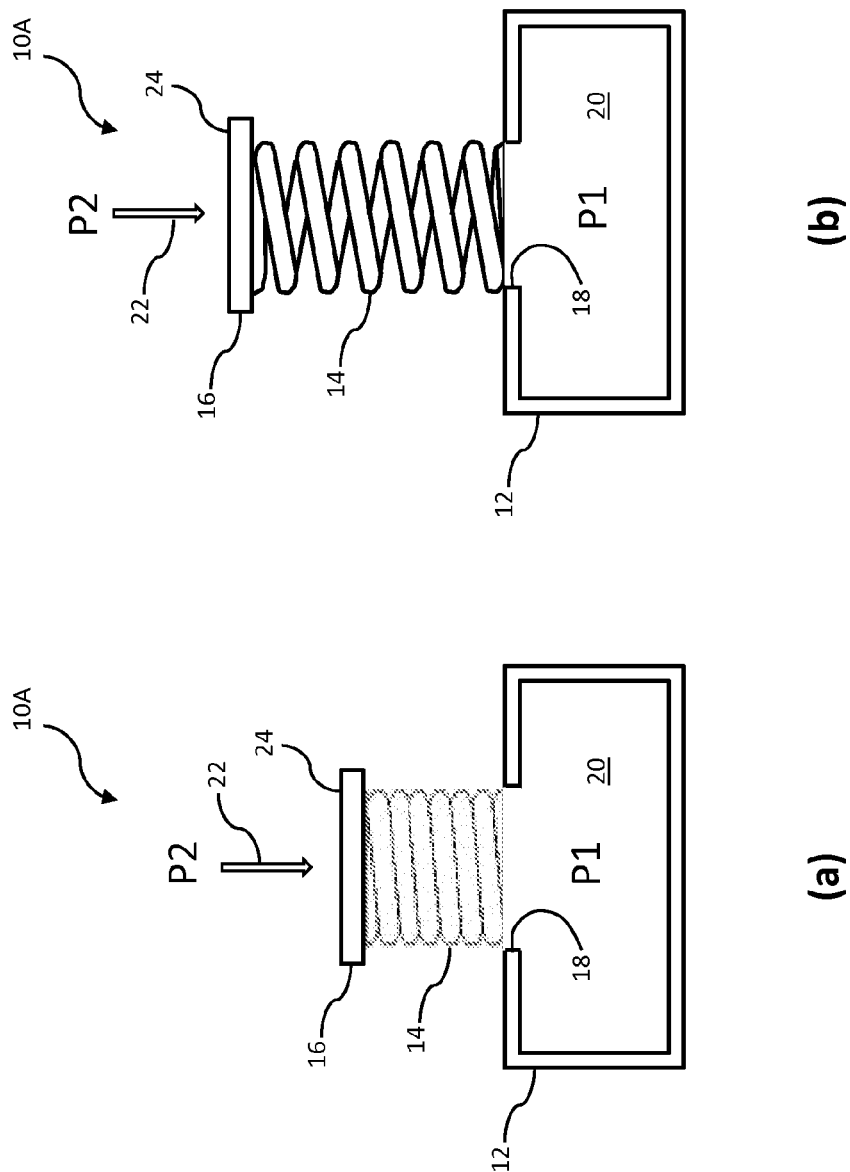
FIGS. 1(a)-(b) are conceptual side views of a pop-off embodiment of a valve according to the teachings of the present disclosure.

Although the drawings represent embodiments of various features and components according to the present disclosure, the drawings are not necessarily to scale and certain features may be exaggerated in order to better illustrate and explain the present disclosure. The exemplifications set out herein illustrate embodiments of the disclosure, and such exemplifications are not to be construed as limiting the scope of the disclosure in any manner.

DETAILED DESCRIPTION OF EMBODIMENTS OF THE DISCLOSURE

For the purposes of promoting an understanding of the principles of the disclosure, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the disclosure is thereby intended. The disclosure includes any alterations and further modifications in the illustrated devices and described methods and further applications of the principles of the disclosure which would normally occur to one skilled in the art to which the disclosure relates.

Referring now to FIGS. 1(a)-(b), a basic embodiment of a spring controlled valve according to the principles of the present disclosure is shown. In this embodiment, valve 10A is configured as a pop-off valve mounted to an enclosure 12. Valve 10A includes a spring 14 with a cover plate 16 mounted to one end. The other end of spring 14 is mounted over an opening 18 in enclosure 12. Spring 14 and cover plate 16 may be mounted to enclosure 12 in any of a variety of suitable ways, such that together spring 14, when in its compressed state as shown in FIG. 1(a), and cover plate 16 prevent gas from flowing out of opening 18 from the interior 20 of enclosure 12. It should be understood that while this disclosure refers throughout to gas, the term gas is intended to encompass and type of gas, liquid or semi-liquid substance. The various valve embodiments described are suitable for use with any such substances. Spring 14 may be coated with a resilient material, such as rubber, so that when spring 14 is compressed, gas cannot escape between the coils of spring 14. Moreover, the connection between spring 14 and cover plate 16 may be configured such that gas cannot escape between spring 14 and cover plate 16.

In FIG. 1(a), the pressure P2 external to enclosure 12 is greater than the pressure P1 within interior 20 of enclosure 12 plus the spring constant of spring 14, which in its relaxed state (as shown in FIG. 1(b)), is expanded. In other words, as long as pressure P2 exerts sufficient force (indicated by arrow 22) on the upper surface 24 of cover plate 16 to maintain spring 14 in its compressed state, gas in interior 20 is prevented from escaping. For example, pressure P1 may be vacuum, and spring 14 may be selected such that when pressure P2 is atmosphere, spring 14 remains compressed. Alternatively, pressure P1 may be a positive pressure, but enclosure 12 is normally exposed to a higher pressure P2 such that spring 14 remains compressed, thereby preventing escape of gas from interior 20 of enclosure 12.

Referring now to FIG. 1(b), when pressure P2 is reduced or pressure P1 is increased (in embodiments where the interior 20 of enclosure 12 is supplied with a supply gas)

such that pressure P2 no longer exerts enough force 22 against upper surface 24 of cover plate 16 to overcome the spring constant of spring 14, spring 14 expands to its expanded state, thereby permitting gas flow between interior 20 and the environment outside enclosure 12 between the coils of spring 14. In one example application of spring controlled valve 10A, enclosure 12 is vacuum sealed and normally exposed to atmospheric pressure. The integrity of the vacuum seal may be easily verified by observing spring 14 in its compressed state (FIG. 1(a)). If, however, enclosure 12 is compromised (e.g., ruptured, pierced, or otherwise opened), then pressure P1 will approach atmosphere (i.e., the difference between pressure P1 and pressure P2 will approach zero), and spring 14 will expand to its relaxed state as shown in FIG. 1(b), thereby indicating a failure of the vacuum seal of enclosure 12.

FIGS. 2(a)-(b) depict a similar pop-off embodiment of a spring controlled valve. Valve 10B of FIGS. 2(a)-(b) includes the same components as valve 10A of FIGS. 1(a)-(b), and the same reference numbers are used. In this embodiment, pressure P1 is normally greater than pressure P2 plus the spring constant of spring 14, which is normally expanded. In this example, enclosure 12 may normally be pressurized above, for example, atmospheric pressure P2, such that the gas at pressure P1 exerts force 22 against cover plate 24 and maintains spring 14 in a compressed state, thereby preventing gas flow from interior 20 of enclosure 12. Again, if enclosure 12 is compromised, pressurized gas within enclosure 20 escapes from enclosure 12, and pressure P1 drops until the spring constant of spring 14 overcomes the difference between pressure P1 and pressure P2, and returns to its normally relaxed state as shown in FIG. 2(b).

Figure 2:
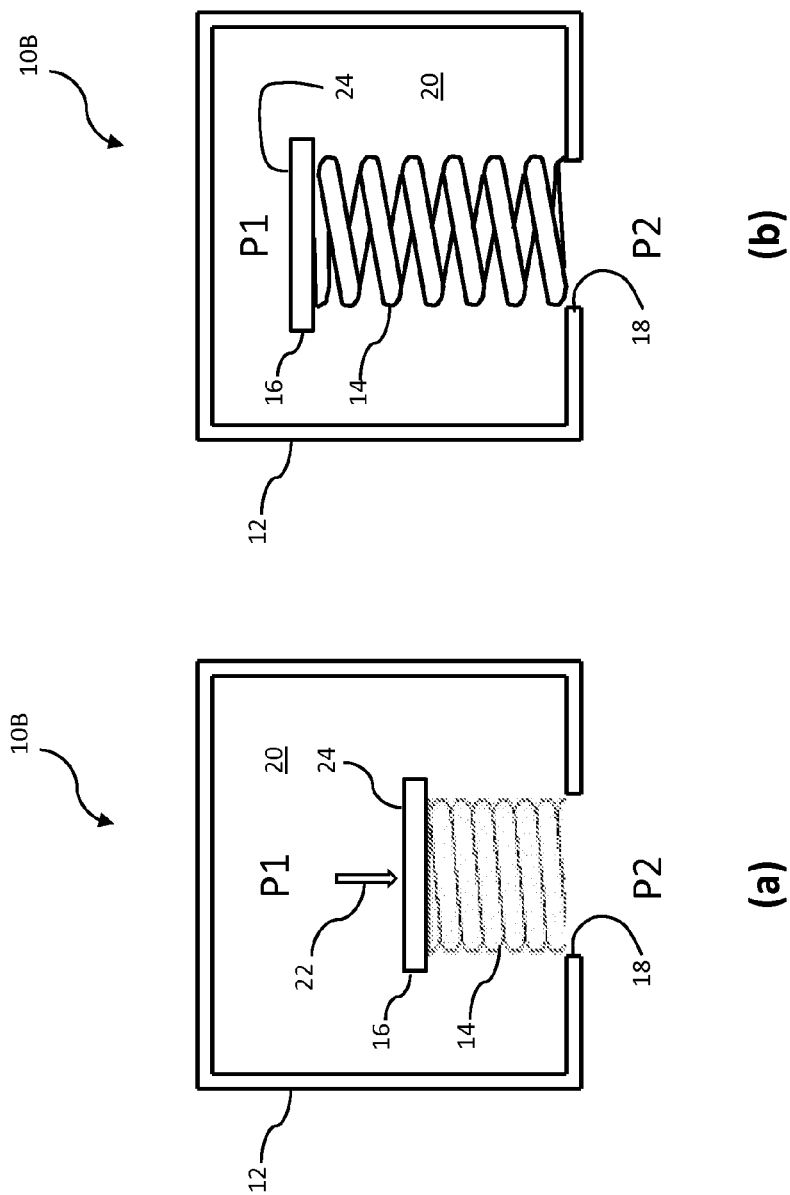
FIGS. 2(a)-(b) are conceptual side views of a second pop-off embodiment of a valve according to the teachings of the present disclosure.

It should be understood that in other applications of the embodiments of FIGS. 1 and 2, enclosure 12 may normally be located in a pressurized chamber (not shown) such that pressure P2 is greater than atmospheric pressure. In such an application, spring 14 may transition from its compressed state to its expanded state as a result of a change in pressure P2 rather than P1. For example, in FIG. 1(a), pressure P1 may be greater than vacuum, but less than pressure P2 plus the spring constant of spring 14. Enclosure 12 may maintain its integrity, but spring 14 may nonetheless expand to its normally expanded state as shown in FIG. 1(b) as a result of a drop in pressure P2. Similarly, in FIG. 2(a), spring 14 may expand to its normally expanded state as shown in FIG. 2(b) as a result of an increase in pressure P2, rather than a drop in pressure P1 as described above. Of course, in other applications spring 14 may expand to its normally expanded state as a result of a change in both pressure P1 and pressure P2. Additionally, the embodiments of FIGS. 1 and 2 may readily be modified such that spring 14 is normally compressed (FIGS. 1(a) and 2(a)), and a change in pressure P1 or P2 or both causes spring 14 to return to its normally compressed state.

Figure 3:
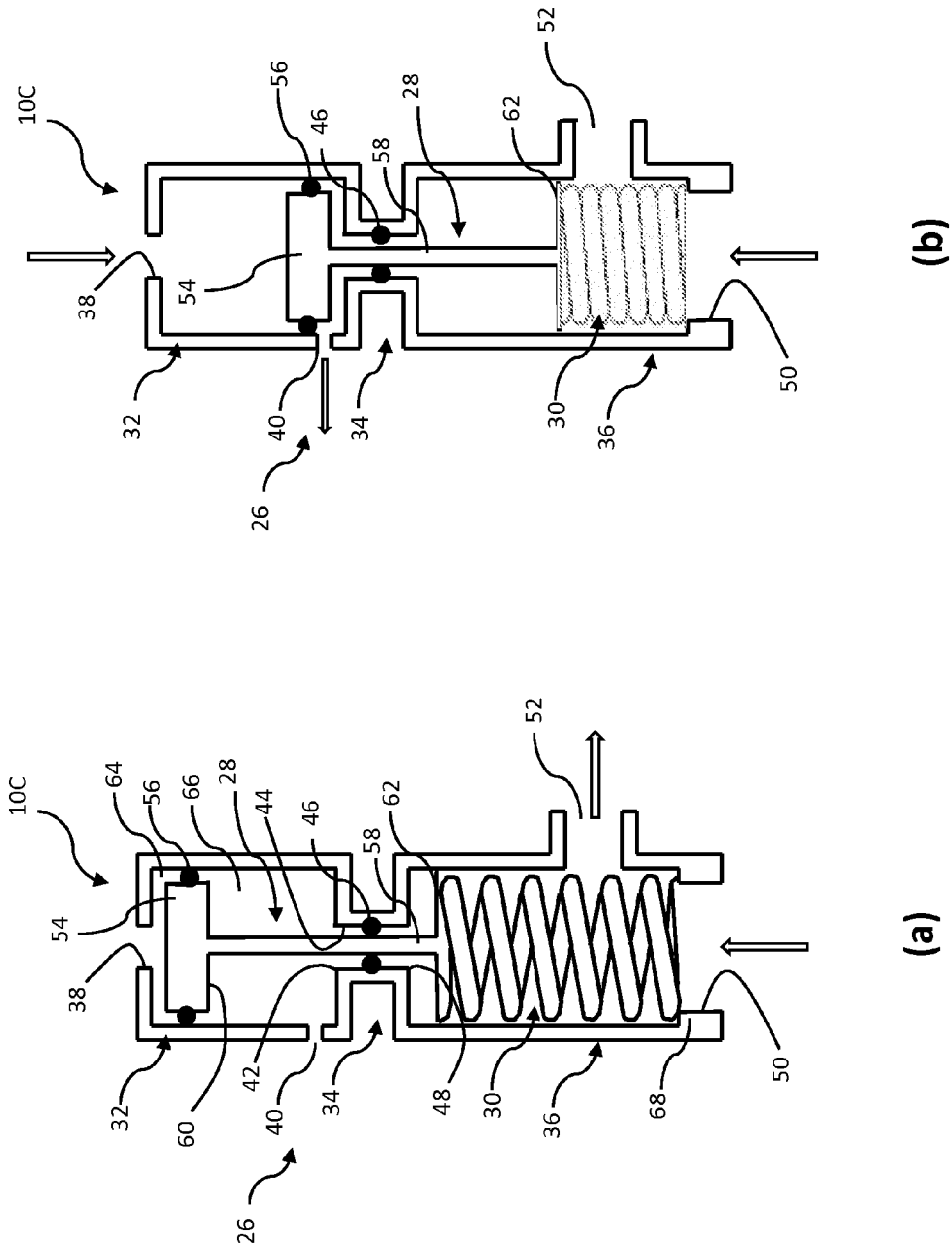
FIGS. 3(a)-(b) are conceptual side views of a gas operated embodiment of a valve according to the teachings of the present disclosure.

FIGS. 3(a)-(b) depict a gas-operated spring controlled valve 100 configured for variable control of the flow of gas between openings. As shown, valve 100 generally includes a housing 26, an actuator 28, and a spring 30. Housing 26 includes an upper portion 32, a connecting portion 34, and a lower portion 36. Upper portion 32 of housing 26 includes an inlet opening 38, a vent 40 and a piston opening 42. Connecting portion 34 of housing 26 includes a bore 44 extending therethrough, which has an O-ring 46 mounted therein and configured to prevent gas flow from lower portion 36 of housing 26 to upper portion 32. Lower portion 36 of housing 26 includes a piston opening 48 in communication with piston bore 44, an inlet opening 50 and an outlet opening 52.

Actuator 28 includes a piston 54 having a circumferential O-ring 56 mounted on its perimeter, a rod 58 extending from the lower surface 60 of piston 54, and a plate 62 mounted at the lower end of rod 58. As shown, O-ring 56 of piston 54 divides upper portion 32 of housing 26 into an upper chamber 64 in flow communication with inlet opening 38 and a lower chamber 66 in flow communication with vent 40. Plate 62 is mounted in contact with or fixedly coupled to spring 30, and when actuator 28 moves in the manner described below, imparts compressive force on spring 30. Spring 30 is disposed between plate 62 and a lower wall 68 of housing lower portion 36.

In this embodiment, gas flows into inlet opening 50 of housing lower portion 36, through opened spaces in spring 30 and out outlet opening 52 for use in a particular application which requires a regulated gas flow. It should be understood that spring 30 is sized such that the outer surfaces of its coils are in contact with the cylindrical side walls of lower portion 36, thereby preventing gas from flowing around spring 30 instead of through the coils. To that end, spring 30 may be formed from material or coated with material (such as rubber) that creates a gas tight barrier between the outer surfaces of the coils of spring 30 and the cylindrical side walls of lower portion 36.

In this embodiment, the amount of gas flow through spring 30 is controlled by the pressure of gas at inlet opening 38 of housing upper portion 32. In FIG. 3(a), the pressure at inlet opening 38 is insufficient to overcome the spring constant of spring 30, which is expanded as shown in FIG. 3(a) when in its relaxed position. Accordingly, gas flows freely from inlet opening 50 to outlet opening 52. As the pressure of gas at inlet opening 38 is increased, actuator 28 compresses spring 30. More specifically, the pressure of the gas exerts force against piston 54, forcing it downwardly as shown in the figures, thereby forcing plate 62 (with rod 58) against spring 30. As piston 54 moves downwardly, gas in lower chamber 66 of housing upper portion 32 is vented through vent 40. As spring 30 compresses, less gas flow is permitted through the coils of spring 30 from inlet opening 50 to outlet opening 52. Eventually, if gas at inlet opening 38 reaches a high enough pressure, then spring 30 becomes fully compressed (as shown in FIG. 3(b)), and gas flow through spring 30 and out outlet opening 52 is prevented.

Figure 4:
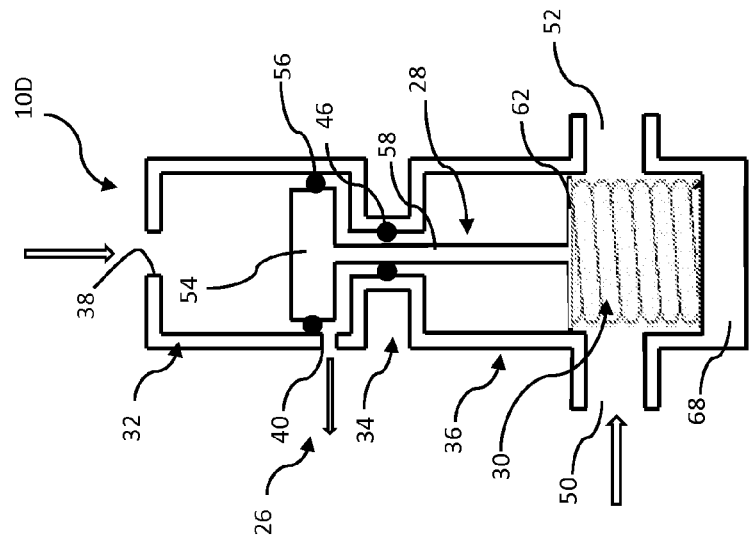
FIGS. 4(a)-(b) are conceptual side views of a second gas operated embodiment of a valve according to the teachings of the present disclosure.
Figure 4:
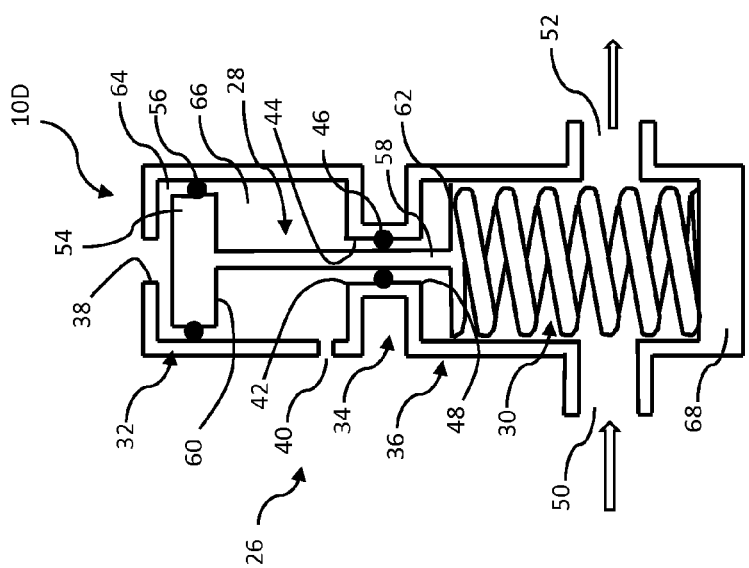

Referring now to FIGS. 4(a)-(b), gas-operated valve 10D is identical to valve 100 of FIGS. 3(a)-(b) except for the location of inlet opening 50 of housing lower portion 36. More specifically, lower wall 68 of lower portion 36 is solid, and a side wall of lower portion 36 includes inlet opening 50. As such, instead of gas flowing into the central opening of spring 30 and out through the spring coils as shown in FIG. 3(a), gas flows in through the spring coils, through the central opening of spring 30, and out through the spring coils. Otherwise, the structure and function of valve 10D is the same as that described above. When the gas at inlet opening 38 reaches a high enough pressure, spring 30 will become fully compressed as shown in FIG. 4(b), thereby preventing gas flow through housing lower portion 36.

Figure 5:
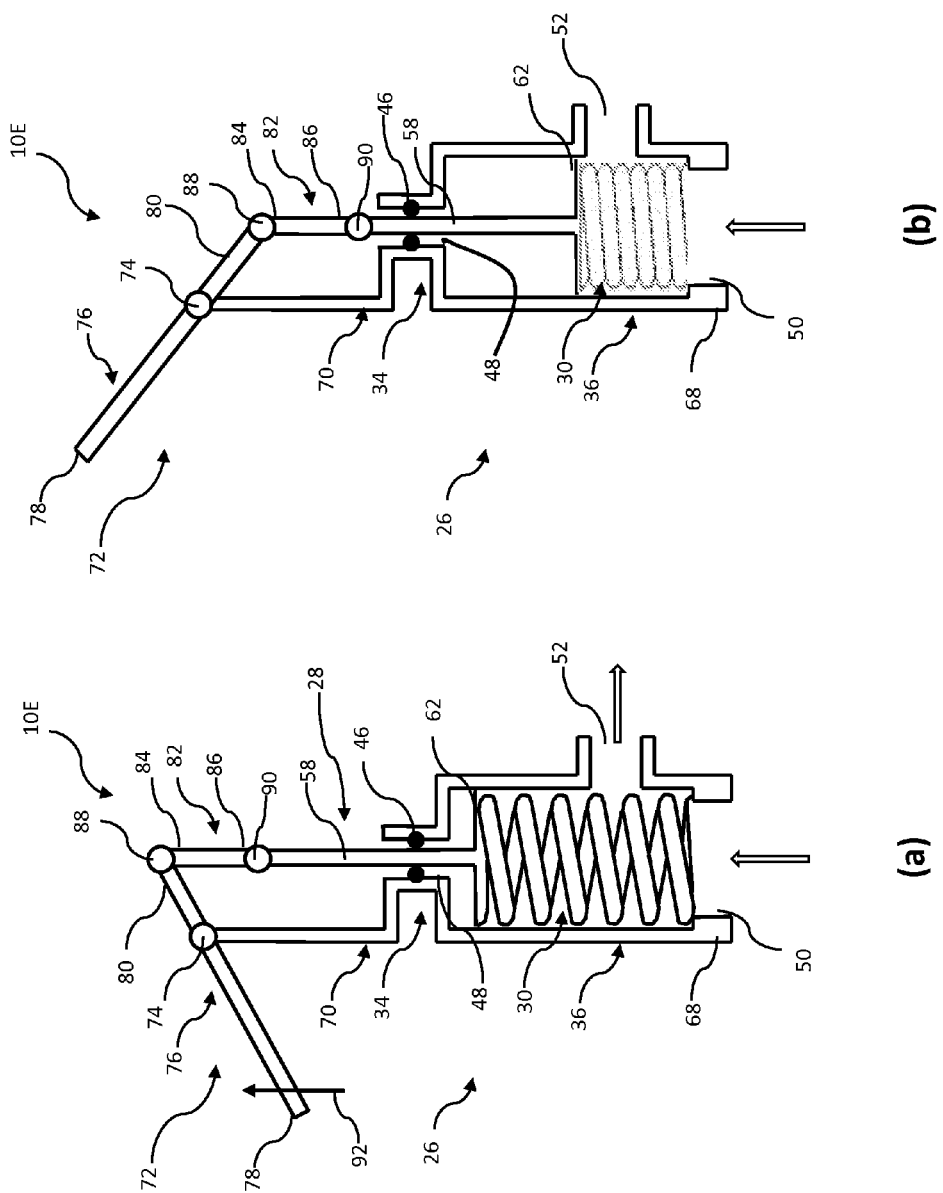
FIGS. 5(a)-(b) are conceptual side views of a mechanically operated embodiment of a valve according to the teachings of the present disclosure.

Referring now to FIGS. 5(a)-(b), an alternative embodiment is depicted that is similar to the embodiment depicted in FIGS. 3(a)-(b), with the primary difference being that this embodiment includes mechanical, rather than pneumatic, control of movement of actuator 28. More specifically, housing 26 of valve 10E does not include upper portion 32 and actuator 28 does not include piston 54. Instead, housing 26 includes a support 70 and actuator 28 includes a drive lever 72 attached to rod 58. Support 70 extends from connecting portion 34 of housing 26 and terminates with a movable connection 74 to drive lever 72. Moveable connection 74 may be a pivot connection, a hinge connection, or any other suitable connection that permits movement of drive lever 72 relative to support 70 in the manner described below. It should further be understood that in other embodiments, support 70 is omitted, and movable connection 74 is mounted to some other structure such that drive lever 72 is positioned for movement as described herein. Drive lever 72 includes a first arm 76 having a first end 78 and a second end 80, and a second arm 82 having a first end 84 and a second end 86. As indicated above, first arm 76 is connected to moveable connection 74. Another moveable connection 88 is disposed at second end 80 of first arm 76, and connects first arm 76 to first end 84 of second arm 82. A third movable connection 90 is disposed at second end 86 of second arm 82, and connects second arm 82 to rod 58.

In the embodiment of FIGS. 5(a)-(b), spring 30 is normally expanded as shown in FIG. 5(a), thereby permitting gas flow between inlet opening 50 and outlet opening 52 (through spring 30). The gas flow may be restricted by moving first end 78 of first arm 76 upwardly as indicated by arrow 92. This causes first arm 76 to pivot about movable connection 74, thereby moving second end 80 downwardly. Movable connections 88 and 90 permit second arm 82 to drive rod 58 downwardly, such that plate 62 compresses spring 30 and controls gas flow through lower portion 36 of housing 26 as described above. Actuator 28 may be moved sufficiently such that spring 30 is fully compressed as shown in FIG. 5(b), thereby preventing gas flow through lower portion 36 of housing 26.

Figure 6:
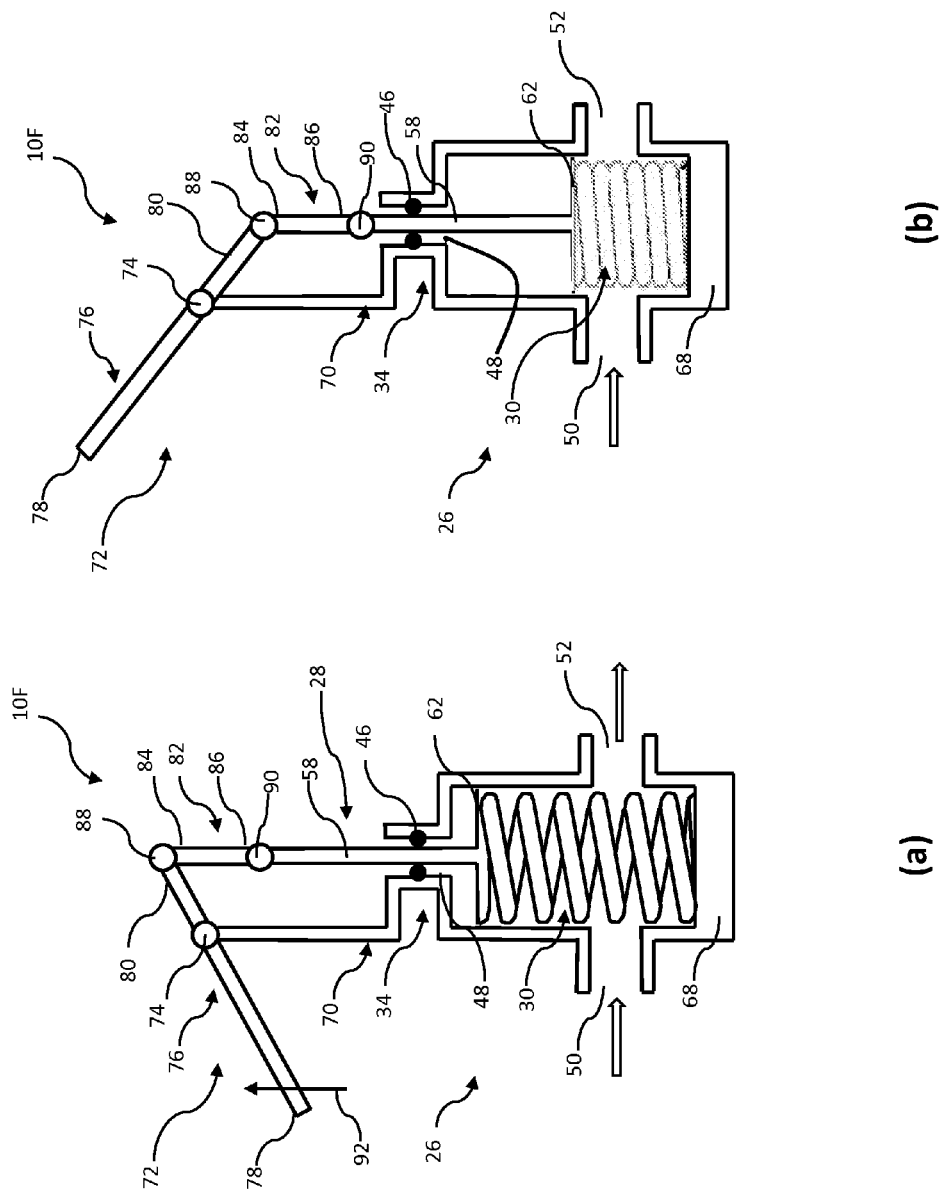
FIGS. 6(a)-(b) are conceptual side views of a second mechanically operated embodiment of a valve according to the teachings of the present disclosure.

Referring now to FIGS. 6(a)-(b), mechanically-operated valve 10F is identical to valve 10E of FIGS. 5(a)-(b) except for the location of inlet opening 50 of housing lower portion 36. More specifically, lower wall 68 of lower portion 36 is solid, and a side wall of lower portion 36 includes inlet opening 50. As such, instead of gas flowing into the central opening of spring 30 and out through the spring coils as shown in FIG. 5(a), gas flows in through the spring coils, through the central opening of spring 30, and out through the spring coils. Otherwise, the structure and function of valve 10F is the same as that described above. When actuator 28 is moved sufficiently such that spring 30 is fully compressed as shown in FIG. 6(b), gas flow through lower portion 36 of housing 26 is prevented.

Figure 7:
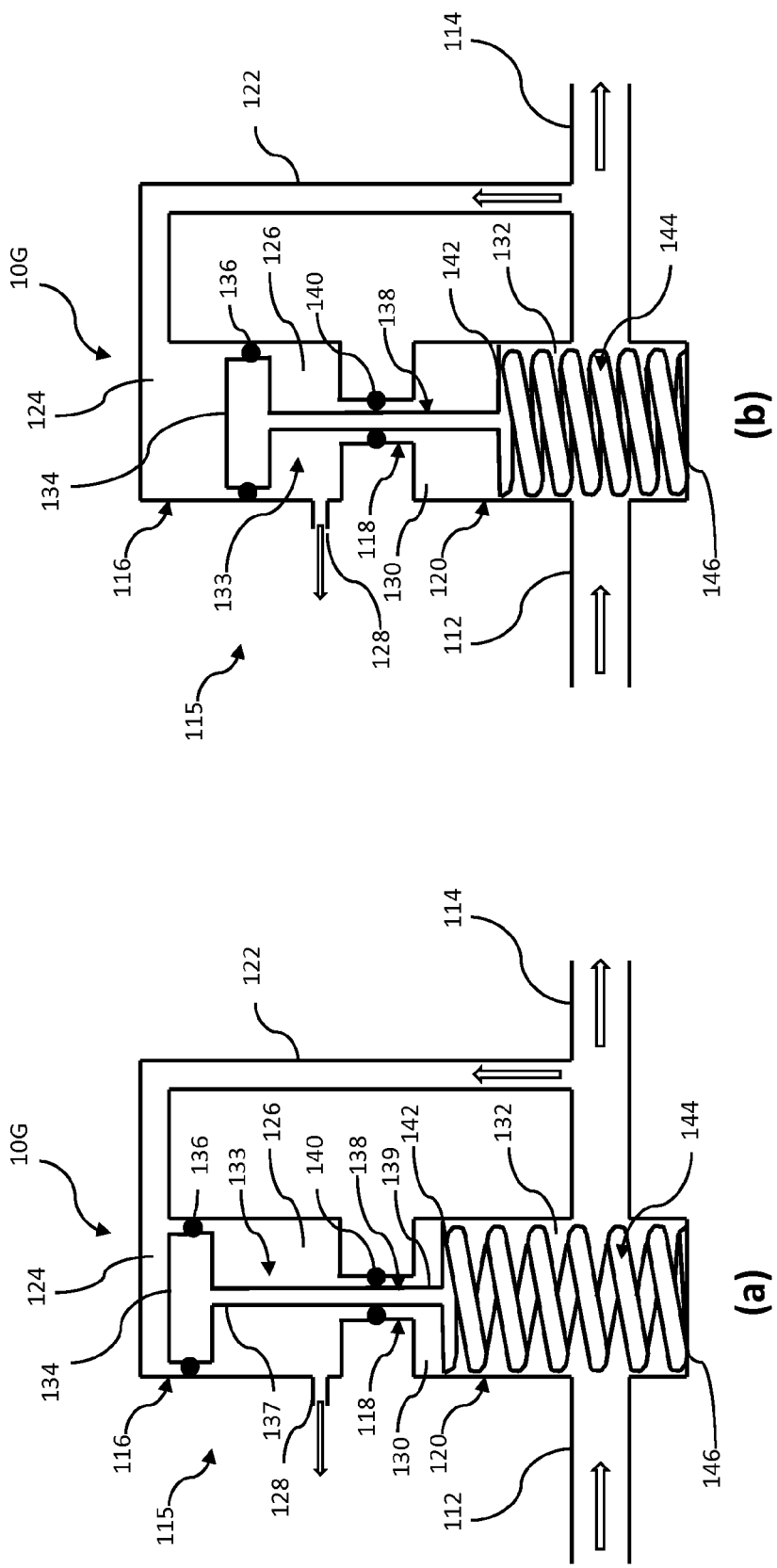
FIGS. 7(a)-(b) are conceptual side views of a pressure regulator embodiment of a valve according to the teachings of the present disclosure.

Referring now to FIGS. 7(a)-(b), an embodiment of a valve according to the principles of the present disclosure is shown with feedback control. In this embodiment, valve 10G is depicted in a pressure regulation application wherein the pressure of a gas or a liquid is regulated by valve 10G. Valve 10G generally includes a first conduit 112, a second conduit 114, a housing 115 having an upper portion 116, a connecting portion 118, and a lower portion 120. Second conduit 114 is connected to the upper portion 116 by a third conduit 122. Upper portion 116 includes an upper chamber 124, a lower chamber 126 and a vent 128 in flow communication with lower chamber 126. Lower portion 120 includes an upper chamber 130 and a lower chamber 132 in flow communication with first conduit 112 and second conduit 114. Valve 10G further includes an actuator 133 having a piston 134 disposed within upper portion 116 of housing 115 and including an O-ring 136 or other means of preventing gas flow between upper chamber 124 and lower chamber 126 of upper portion 116. A proximal end 137 of a rod 138 is connected to a lower end of piston 134 and extends through connecting portion 118. An O-ring 140 or other means of preventing gas flow between upper portion 116 and lower portion 120 is disposed within connecting portion 118 in contact with rod 138. A distal end 139 of rod 138 is connected to a plate 142, which contacts and imparts compressive force in this embodiment on a spring 144 in the manner described below. Spring 144 is disposed between plate 142 and a lower wall 146 of lower portion 120 and is expanded in its relaxed condition.

In this embodiment, gas flows into first conduit 112, through opened spaces in the coils of spring 144 and out second conduit 114 for use in a particular application which requires a regulated gas pressure. It should be understood that spring 144 is sized such that the outer surfaces of its coils are in contact with the cylindrical side walls of housing lower portion 20, thereby preventing gas from flowing around spring 144 instead of through the coils. To that end, as is the case for the earlier-described embodiments, spring 144 may be formed from material or coated with material (such as rubber) that creates a gas tight barrier between the outer surfaces of the coils of spring 144 and the cylindrical side walls of lower portion 20 of housing 115.

The pressure of gas flowing through valve 10G is controlled, in part, by the constant of spring 144 in the manner described herein. As gas flows out of second conduit 114, it also flows into third conduit 122 (which acts as a tap) and into upper chamber 124 of upper portion 116. The pressure from the gas flow into upper chamber 124 is applied to piston 134, and provides downward force onto piston 134 and spring 144. This downward force is not resisted by gas in lower chamber 126 of upper portion 116 as the gas in lower chamber 126 is vented through vent 128. As spring 144 is compressed as a result of the pressure on piston 134, the coils of spring 144 become closer together and provide additional resistance to gas flow through lower portion 120. Consequently, in applications where the pressure of the gas at first conduit 112 varies, the pressure of the gas out of second conduit 114 is regulated by valve 10G.

More specifically, FIG. 7(a) depicts a situation where the gas pressure at first conduit 112 is relatively low. Accordingly, the gas pressure at second conduit 114 (and therefore at third conduit 122 and upper chamber 124 of upper portion 116) is also relatively low. Thus, the pressure on piston 134 is also relatively low and spring 144 is substantially relaxed in its normally expanded condition, permitting more gas flow though lower portion 120 than would be permitted if spring 144 were compressed.

Referring now to FIG. 7(b), the pressure of gas into first conduit 112 has increased. As the gas pressure at conduit 112 increases, the pressure of the gas at conduit 114 (and therefore at conduit 122 and upper chamber 124 of upper portion 116) also increases. Consequently, piston 134 moves downwardly, and spring 144 compresses. This compression increases the resistance to gas flow though lower portion 120. Accordingly, although the pressure of gas at conduit 112 has increased, the pressure of the gas through conduit 114 does not increase proportionally, and is regulated to a value that is proportional to the constant of spring 144. As will be appreciated by those skilled in the art, the size of conduit 122 and the area of piston 134 also influence the amount by which the constant of spring 144 influences the flow of gas across lower portion 120. By designing the constant of spring 144 and the size of conduit 122 and piston 134, the pressure of gas out of conduit 114 may be regulated to within specified tolerances, even though the pressure of gas at conduit 112 varies.

As will be understood by those skilled in the art, valve 10G could readily be modified to regulate vacuum. In such an application, conduit 122 would be connected to lower chamber 126 of upper portion 116, and vent 128 would be moved to upper chamber 124.

Figure 8:
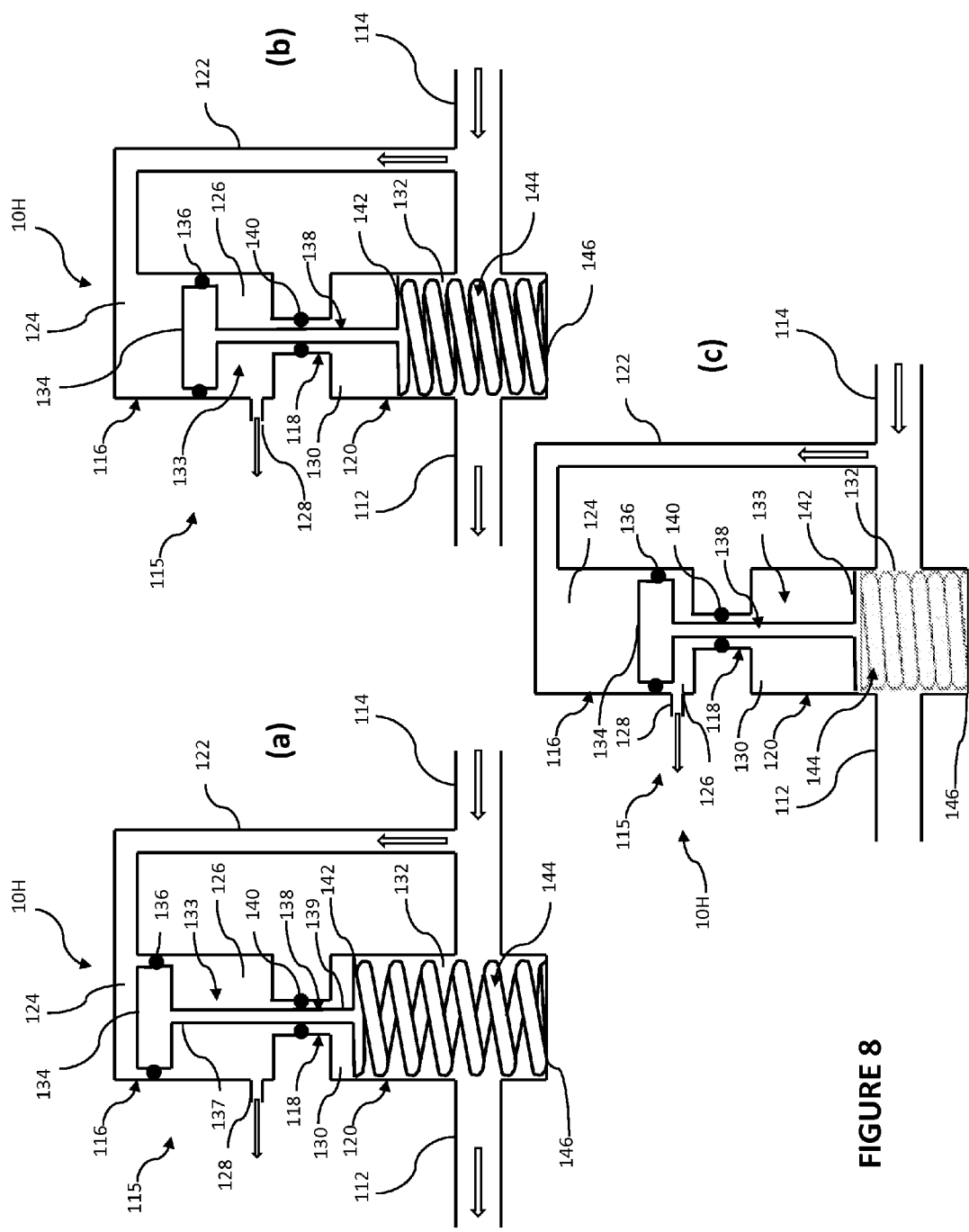
FIGS. 8(a)-(c) are conceptual side views of a flow restrictor embodiment of a valve according to the teachings of the present disclosure.

FIGS. 8(a)-(c) depict a flow restrictor valve 10H, which receives gas at conduit 114 instead of conduit 112 as was the case for valve 10G. The structure of valve 10H is identical to that of valve 10G. In operation, inlet gas at conduit 114 is also provided to conduit 122. The gas flows through lower portion 120 of housing 115 (through spring 144) and out of conduit 112. As the inlet gas pressure increases at conduit 114, the pressure supplied through conduit 122 to the upper surface of piston 134 also increases, thereby causing actuator 133 to move downwardly as depicted in the figures. As shown in FIG. 8(b), this compresses spring 144, thereby restricting gas flow through lower portion 120. Eventually, if the inlet gas reaches a certain pressure, actuator 133 will fully compress spring 144 (as shown in FIG. 8(c)), and prevent further gas flow through lower portion 120. This cut off gas pressure is a function of the constant of spring 144, the size of conduit 122, and the area of the upper surface of piston 134.

Figure 9:
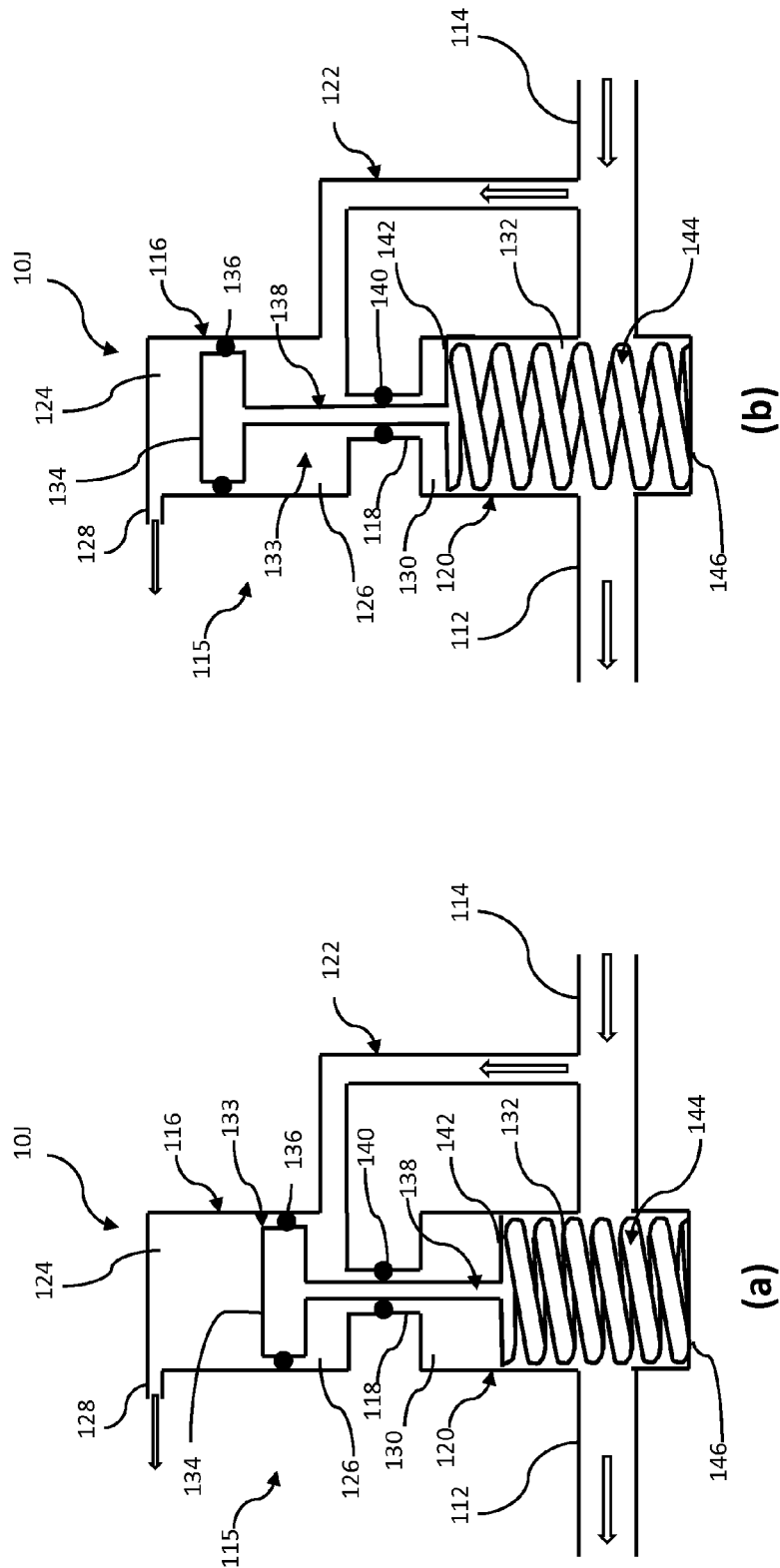
FIGS. 9(a)-(b) are conceptual side views of a back-pressure regulator embodiment of a valve according to the teachings of the present disclosure.

FIGS. 9(a)-(b) depict another embodiment of a valve of similar construction to valve 10G of FIGS. 7(a)-(b), but configured as a back-pressure regulator. Valve 10J differs from valve 10G in that vent 128 of valve 10J is disposed in upper chamber 124 (rather than lower chamber 126) of housing upper portion 116 and conduit 122 is connected to lower chamber 126 (rather than upper chamber 124) of housing upper portion 116. Additionally, spring 144 is compressed in its relaxed state and gas flow is from conduit 114 to conduit 112. Accordingly, gas flow is restricted (as shown in FIG. 9(a)) or even prevented until the gas at conduit 114 reaches a certain pressure, which overcomes the constant of spring 144. Spring 144 is then expanded by the pressure applied through conduit 122 to the lower surface of piston 134, which drives actuator 133 upwardly (as viewed in the figures). Spring 144 is attached to lower wall 146 of lower portion 120, as well as to plate 142 of actuator 133. Spring 144 continues to expand with increases in gas pressure at conduit 114, and gas flow continues to increase according. Eventually, as depicted in FIG. 9(b), spring 144 will resist further expansion as it reaches a fully expanded state, thereby preventing further increases in gas flow through lower portion 120 even as pressure at conduit 114 continues to increase.

Figure 10:
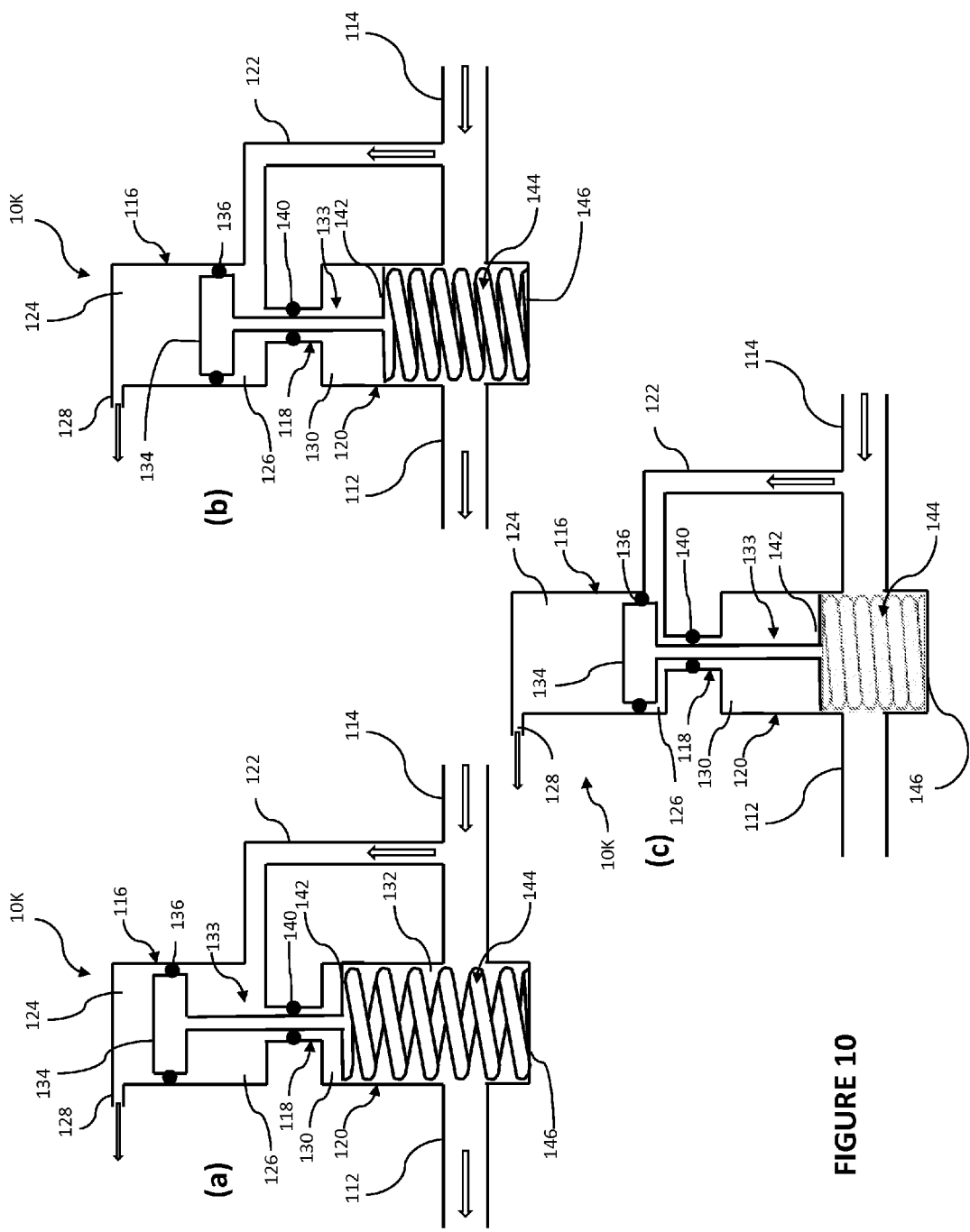
FIGS. 10(a)-(c) are conceptual side views of a second back-pressure regulator embodiment of a valve according to the teachings of the present disclosure.

In the embodiment depicted in FIGS. 10(a)-(c), back-pressure regulator valve 10K regulates gas flow with decreases in inlet gas pressure, until the inlet gas pressure reaches a lower threshold, whereupon gas flow is prevented. Valve 10K is similar in construction to valve 10H of FIG. 8, except that valve 10K includes vent 128 in upper chamber 124 (rather than lower chamber 126) of housing upper portion 116 and conduit 122 is connected to lower chamber 126 (rather than upper chamber 124) of housing upper portion 116. Additionally, spring 144 is compressed in its relaxed state. In FIG. 10(a), gas at conduit 114 is at a high pressure, thereby causing actuator 133 to move upwardly (as viewed in the figures) as this high pressure gas is applied to the lower surface of piston 134 through conduit 122. This causes spring 144 to expand (and gas in upper chamber 124 to pass through vent 128), and provides maximum gas flow through lower portion 120.

As the pressure of the gas into conduit 114 decreases, the pressure against the lower surface of piston 134 also decreases. As such, spring 144 moves toward its relaxed, compressed state, and the flow of gas through lower portion 120 is decreased. Ultimately, when the pressure of gas into conduit 114 reaches a certain low threshold, which corresponds to the constant of spring 144, the pressure against the lower surface of piston 134 will be insufficient to prevent spring 144 from reaching its relaxed, fully compressed state (as shown in FIG. 10(c)). Thus, when the pressure of gas into conduit 114 falls below this threshold, gas flow through lower portion 120 is prevented. As such, valve 10K regulates gas pressure out of conduit 112 through a range of inlet pressures at conduit 114, but cuts off gas flow at inlet pressures below the threshold.

Figure 11:
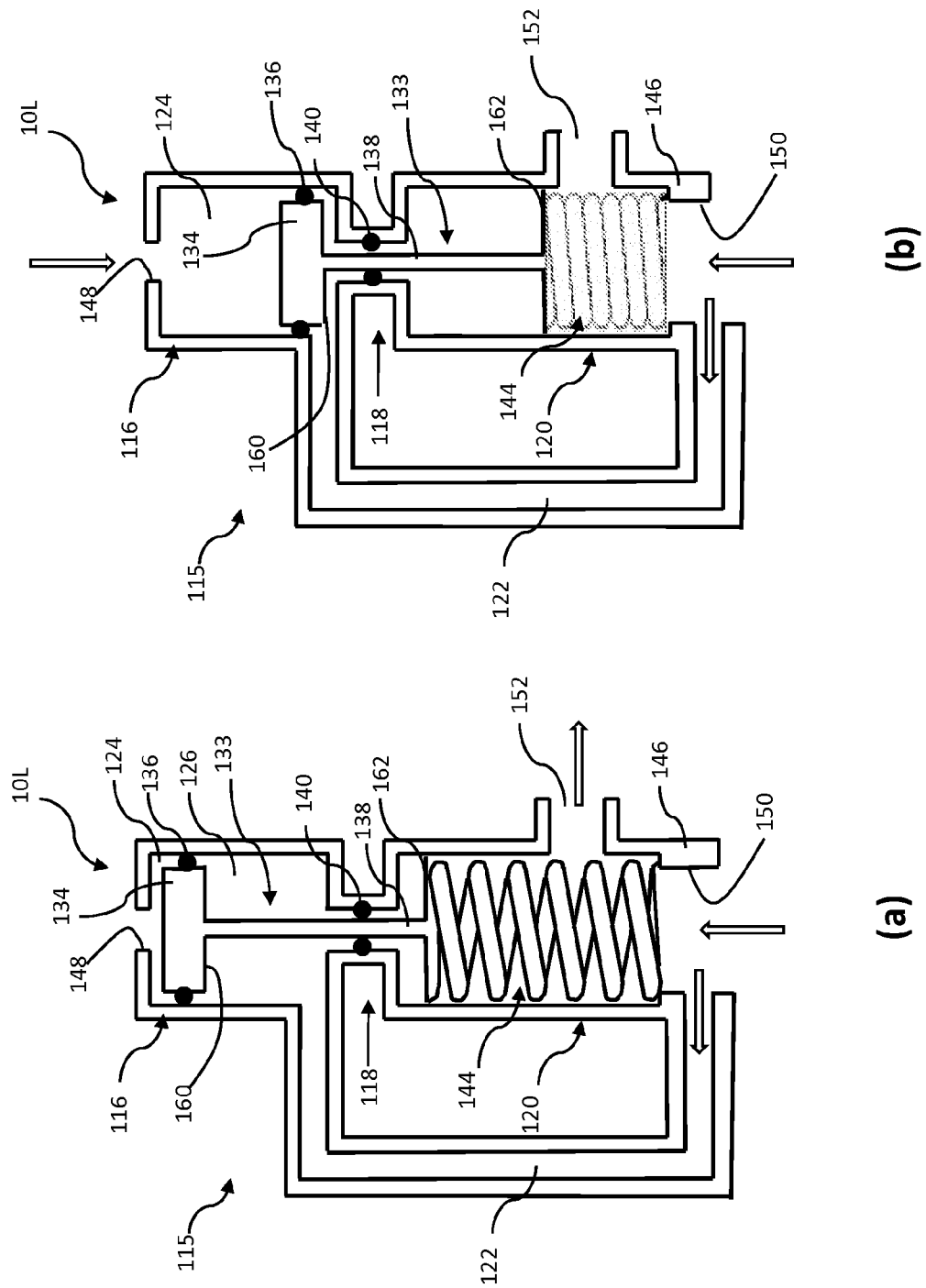
FIGS. 11(a)-(b) are conceptual side views of a third back-pressure regulator embodiment of a valve according to the teachings of the present disclosure.

Referring now to FIGS. 11(a)-(b), another embodiment of a back-pressure regulator valve according to the principles of the present disclosure is shown. Valve 10L is shown in a vacuum regulation application. As shown, valve 10L includes an opening 148 into upper chamber 124 of housing 115, an opening 150 in lower portion 120 through lower wall 146, and an opening 152. Opening 150 is in flow communication with conduit 122, which is also in flow communication with lower chamber 126 of housing upper portion 116.

In this embodiment, gas flows through opening 150, through the coils of spring 144, and out opening 152 when the pressure of the gas at opening 150 is sufficiently high. More specifically, the pressure of the gas at opening 150 is applied through conduit 122 to the lower surface 160 of actuator 133. When that pressure is sufficiently high to overcome the constant of spring 144 (which is normally compressed in its relaxed state), spring 144 is expanded as shown in FIG. 11(a), thereby permitting gas flow through lower portion 120 of housing 115 to atmosphere, thereby reducing and regulating the pressure at opening 150. When the pressure of gas at opening 150 decreases to a threshold pressure, the gas supplied through conduit 122 is no longer sufficient to cause actuator 133 to expand spring 144, and spring 144 returns to its relaxed, fully compressed state (as shown in FIG. 11(b)), thereby preventing gas flow through lower portion 120 of housing.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A gas operated valve, including:
    a housing having an upper portion and a lower portion;
    an actuator having a piston disposed in the upper portion, a plate disposed in the lower portion, and a rod connecting the piston to the plate; and
    a spring disposed in the lower portion, the spring having a central opening defined by a plurality of coils and being movable between an expanded state and a compressed state, the central opening being closed on one end of the spring by a wall of the housing and on the other end of the spring by the plate;
    wherein the upper portion of the housing has an inlet opening to receive control gas exterior to the housing, and the lower portion of the housing has an inlet opening to receive supply gas and an outlet opening to provide the supply gas to an application; and
    wherein the amount of supply gas flow from the lower portion inlet opening to the outlet opening varies with movement of the spring between the expanded state, wherein supply gas flows into the lower portion inlet opening, into the central opening of the spring, out of the central opening through gaps between the coils, and out of the lower portion through the outlet opening, and the compressed state, wherein the coils are in contact with one another thereby substantially preventing supply flow between the lower portion inlet opening and the outlet opening, the movement of the spring being controlled by movement of the actuator in response to pressure of the control gas at the upper portion inlet opening.

2. The valve of claim 1, wherein the coils of the spring are coated with a substantially resilient material so that when the spring is in its compressed state and the coils are in contact with one another, the resilient material forms a gas-tight seal between the coils.

3. The valve of claim 1, wherein as the pressure of the control gas increases, the control gas at the upper portion inlet opening applies increased pressure to a surface of the piston to move the piston toward the spring, thereby causing the plate to compress the spring against a force of a constant of the spring, reduce the gaps between the coils, and increase resistance to the flow of supply gas from the lower portion inlet opening to the outlet opening.

4. The valve of claim 1, wherein the lower portion inlet opening is in flow communication with the central opening of the spring through a first end of the spring, such that when the spring is in the expanded state, the supply gas flows into the lower portion inlet opening, into the central opening of the spring through the first end of the spring, out of the central opening through the gaps between the coils, and out of the lower portion through the outlet opening.

5. The valve of claim 1, the housing further including a connecting portion having a bore extending therethrough between the upper portion and the lower portion, the actuator rod extending through the bore.

6. The valve of claim 5, the housing further including an O-ring disposed in the bore in contact with the rod to prevent gas flow between the upper portion and the lower portion.

7. The valve of claim 1, the actuator further including an O-ring disposed about a perimeter of the piston in contact with an inner surface of the upper portion, the O-ring thereby preventing gas flow between a lower chamber of the upper portion and an upper chamber of the upper portion.

8. The valve of claim 7, the housing further including a vent opening in the lower chamber of the upper portion.

9. A flow restrictor, including:
a housing having a lower portion and an upper portion, the lower portion being coupled to a first conduit to receive supply gas and a second conduit to provide the supply gas to an application, the upper portion being coupled to a third conduit which is coupled as a tap to the first conduit;
a spring disposed in the lower portion having a first end in contact with a wall of the housing and a second end; and
an actuator including a piston disposed in the upper portion, a plate disposed in the lower portion in contact with the second end of the spring, and a rod connecting the piston to the plate;
wherein the spring is movable between a normally expanded state, wherein supply gas can flow from the first conduit to the second conduit through gaps in a plurality of coils of the spring, and a compressed state wherein the coils are in contact with one another thereby substantially preventing supply gas from flowing from the first conduit to the second conduit; and
wherein as pressure of the supply gas at the first conduit increases, flow of the supply gas at the second conduit is permitted, but regulated as a function of a constant of the spring in that gas flowing through the first conduit also flows through the third conduit into the upper portion and applies pressure against the piston, causing the plate to move the spring, against the spring constant, toward the compressed state, thereby moving the coils closer together and increasing resistance to gas flow.

10. The flow restrictor of claim 9, wherein the coils of the spring are coated with a substantially resilient material which forms a substantially gas-tight seal between the coils when the spring is in the compressed state.

11. The flow restrictor of claim 9, wherein a central opening of the spring is closed at the first end by the wall of the housing and closed at the second end by the actuator plate.

12. The flow restrictor of claim 9, the housing further including a connecting portion having a bore extending therethrough between the upper portion and the lower portion, the actuator rod extending through the bore.

13. The flow restrictor of claim 12, the housing further including an O-ring disposed in the bore in contact with the rod to prevent gas flow between the upper portion and the lower portion.

14. The flow restrictor of claim 9, the actuator further including an O-ring carried by the piston in contact with an inner surface of the upper portion, the O-ring thereby preventing gas flow between a lower chamber of the upper portion and an upper chamber of the upper portion.

15. The flow restrictor of claim 14, the housing further including a vent opening in the lower chamber of the upper portion.

16. A back-pressure regulator, including:
a housing having a lower portion and an upper portion, the lower portion being coupled to a first conduit to receive supply gas and a second conduit to provide the supply gas to an application, the upper portion being coupled to a third conduit which is coupled as a tap to the first conduit;
a spring disposed in the lower portion having a first end attached to a wall of the housing and a second end; and
an actuator including a piston disposed in the upper portion, a plate disposed in the lower portion attached to the second end of the spring, and a rod connecting the piston to the plate;
wherein the spring is movable between a normally compressed state, wherein coils of the spring are in contact with one another thereby substantially preventing supply gas from flowing from the first conduit to the second conduit, and an expanded state wherein the coils are moved apart from one another thereby permitting supply gas to flow from the first conduit to the second conduit through gaps between the coils;
wherein the spring substantially prevents supply gas flow through the lower portion of the housing until a pressure of the supply gas at the first conduit, which is applied to the piston through the third conduit, is sufficient to move the actuator away from the spring, thereby overcoming a constant of the spring and moving the spring out of the normally compressed state; and wherein a central opening of the spring is closed at the first end by the wall of the housing and closed at the second end by the actuator plate.

17. The regulator of claim 16, wherein the coils of the spring are coated with a substantially resilient material which forms a substantially gas-tight seal between the coils when the spring is in the compressed state.

18. The regulator of claim 16, wherein the first and second conduits are coupled to the lower portion at locations between the ends of the spring such that when the spring is in the expanded state, the supply gas flows from the first conduit, into a central opening of the spring through the gaps between the coils, out of the central opening through the gaps between the coils, and out of the lower portion through the second conduit.

19. The regulator of claim 16, the housing further including a connecting portion having a bore extending therethrough between the upper portion and the lower portion, the actuator rod extending through the bore.

20. The regulator of claim 19, the housing further including an O-ring disposed in the bore in contact with the rod to prevent gas flow between the upper portion and the lower portion.

21. The regulator of claim 16, the actuator further including an O-ring carried by the piston in contact with an inner surface of the upper portion, the O-ring thereby preventing gas flow between a lower chamber of the upper portion and an upper chamber of the upper portion.

22. The regulator of claim 21, the housing further including a vent opening in the upper chamber of the upper portion, the third conduit being coupled to the lower chamber of the upper portion.

23. A back-pressure regulator, including:
a housing having a lower portion and an upper portion, the lower portion having a first opening in flow communication with gas exterior to the housing and a second opening in flow communication with the gas, the upper portion having a first opening in flow communication with a conduit coupled to the first opening of the lower portion;
a spring disposed in the lower portion; and
an actuator including a piston disposed in the upper portion, a plate disposed in the lower portion attached to the spring, and a rod connecting the piston to the plate;
wherein the spring is movable between a normally compressed state, wherein coils of the spring are in contact with one another thereby substantially preventing gas flow between the first and second openings of the lower portion, and an expanded state wherein the coils are moved apart from one another thereby permitting gas flow between the first and second openings of the lower portion through gaps between the coils; and
wherein the spring substantially prevents gas flow through the lower portion of the housing until a pressure of the gas at the first opening of the lower portion, which is applied to the piston through the conduit, is sufficient to move the actuator away from the spring, thereby overcoming a constant of the spring and moving the spring out of the normally compressed state;
wherein the spring includes a central opening which is in flow communication with the first opening of the lower portion at a first end and closed at a second end by the actuator plate; and
wherein when the spring is in the expanded state, the gas flows from the first opening of the lower portion, into the central opening of the spring through the first end of the spring, out of the central opening through the gaps between the coils, and out of the lower portion through the second opening.

24. The regulator of claim 23, wherein the coils of the spring are coated with a substantially resilient material which forms a substantially gas-tight seal between the coils when the spring is in the compressed state.

25. The regulator of claim 23, the housing further including a connecting portion having a bore extending therethrough between the upper portion and the lower portion, the actuator rod extending through the bore.

26. The regulator of claim 25, the housing further including an O-ring disposed in the bore in contact with the rod to prevent gas flow between the upper portion and the lower portion.

27. The regulator of claim 23, the actuator further including an O-ring carried by the piston in contact with an inner surface of the upper portion, the O-ring thereby preventing gas flow between a lower chamber of the upper portion and an upper chamber of the upper portion.

28. The regulator of claim 27, wherein the conduit is coupled to the lower chamber of the upper portion.

* * * * *